Patented Jan. 17, 1928.

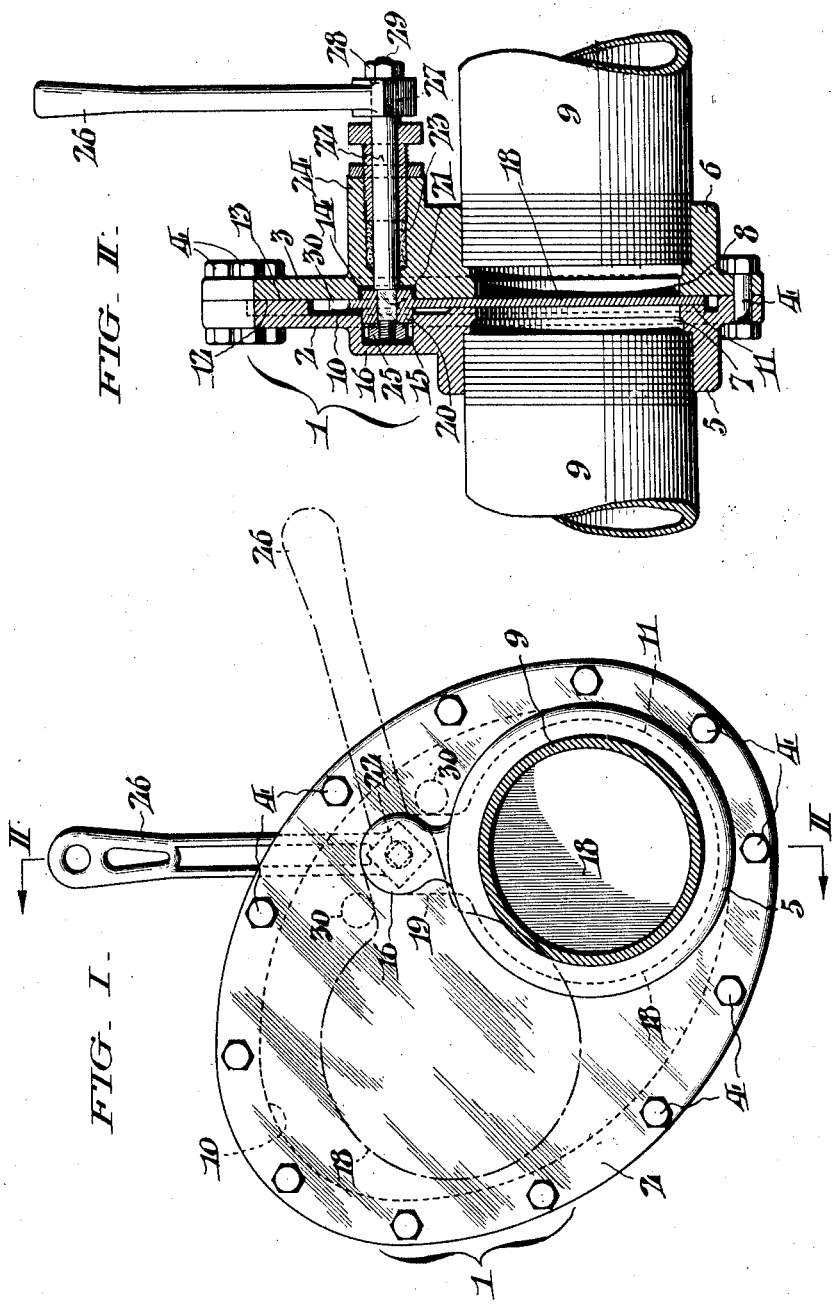

1,656,280

UNITED STATES PATENT OFFICE.

JAMES D. LALOR, OF BALTIMORE, MARYLAND, ASSIGNOR TO THE LAWLOR FUEL OIL SYSTEM COMPANY, INC., OF BALTIMORE, MARYLAND, A CORPORATION OF MARYLAND.

VALVE.

Application filed December 15, 1924. Serial No. 756,001.

This invention relates to valves, more especially to a type wherein the flow therethrough is controlled by a shutter movable transversely across the flow passage, such valves being particularly useful, for example, in connection with liquid fuel burning installations to control supply of compressed air to nozzle burners whereby the oil is vaporized and commingled for acceleration and intensification of combustion.

My invention is directed toward securing in connection with valves of the sort specifically mentioned, more efficient fluid tightness against leakage without impairing facility of their operation; greater reliability against disturbance in adjusted positions through jarring and vibration; as well as toward obtaining the advantages of structural simplicity more especially with regard to ease of assembling and freedom from derangement in long continued usage.

The description that follows sets forth a valve structure in which the desiderata above outlined is fully attained, the claims appended thereto defining those features which I believe to be novel and wholly within the scope of the present invention.

With reference to the drawings, Fig. I is an illustration of a valve organization conveniently embodying my invention; and, Fig. II is a sectional view of the same taken as indicated by the arrows II—II in Fig. I.

The casing of the valve generally indicated by the numeral 1, may be conveniently made elliptic in configuration and consists of two component halves or sections 2, 3 that are assembled in opposed relation as shown in Fig. II and clamped together by a series of screw bolts 4. The casing sections 2, 3 have eccentrically-disposed integral outstanding bosses 5, 6 respectively, that are—in the present instance—axially coincident with what corresponds substantially to the center of curvature of one end of the ellipse. In the assemblage these bosses 5, 6 are aligned as shown, and provided with openings 7, 8 which jointly constitute the flow passage through the valve 1, said openings being screw threaded for reception and engagement of contiguous ends of line pipe sections 9, 9. The inside of the casing section 2 is for the most part recessed as at 10, only comparatively narrow marginal faces 11 and 12 occupying different planes being left outstanding, the first of these faces surrounding the boss opening 7, and the other extending perimetrically about said section to engage the opposing face 13 of the companion casing section 3, thereby to effect closure of the recess 10. The abutting faces 12, 13 are both machine finished to ensure fluid tightness without necessitating use of a special packing gasket; while the latter facing is continuous or uninterrupted except for a circular pocket 14 centered in a point lying in the minor axis of the ellipse, see Fig. I, said pocket having its counterpart in a registering circular pocket 15 of smaller diameter in an offset 16 of the casing section 2. The purpose of these pockets will presently be explained.

The movable member of the valve 1 is in the form of a shutter plate 18 in this instance of circular outline, and of a diameter corresponding substantially to the outside dimensions of the face 11 so as to completely overlap the latter when in the closed position shown, thus to prevent flow through the valve. The discous plate 18 is machine finished on opposite sides for accurate frictional fit between the opposed faces 11, 13 so as to make a fluid-tight juncture with them, and to be held by them against displacement in adjusted positions. This plate 18 has a radially projecting ear 19, Fig. I, whereon is formed a boss 20 that is accommodated in the cavity jointly formed by the registering pockets 14, 15 of the casing sections 2, 3, said ear being provided with a polygonal opening adapted to be engaged by a correspondingly configured portion 21 of an actuating shaft 22 that extends outwardly through a stuffing box 23 in a boss 24 on the casing section 3. The inner extremity of the shaft 22 beyond the polygonal portion 21, is reduced to cylindric formation and screw threaded for engagement by a clamp nut 25 whereby the shaft 22 and the plate 18 are fixed in rigid relation. One end of the boss 20 of the plate 18 fits the circular pocket 15 thereby assisting journal support of the shaft 22; and it is to be particularly noted that the depth of this pocket is such as to define a substantial clearance beyond the clamp nut 25, and that the opposite end of the boss projecting into the pocket 14 has clearance all around. By virtue of these clearances, it will be seen that the shaft 22 may "float" in the direction of its axis without inducing any binding such as would be likely to interfere with ready shifting of the shutter plate 18. As a means to enable such shifting, a hand lever 26 is secured to the protruding end of the shaft 22, said end being squared as at 27 to fit a similarly shaped aperture in the hub end of said hand lever. A clamp nut 28 engaging a short threaded prolongation 29 of the shaft 22 functions as a means to retain the hand lever 26 in place. The full open and closed positions of the discous plate 18 (the first being indicated in dot and dash lines in Fig. I) are determined by spaced limiting stop pins or lugs 30 projecting inwardly from one of the casing members and adapted to engage opposite side edges of the ear 15 of said plate.

Attention is directed to the fact that regardless of the position of the plate 18, it is always afforded support by reason of full contact with the continuous face 13 of the casing section 3; and also that said plate is effectively held against vibrating even when in full open position as a result of being still engaged between said face 13 and the opposing marginal facing 11 about the opening 7 in casing section 2, and yet quite capable of being shifted without undue restraint.

From the foregoing it will be apparent that I have provided a flow control valve that may be quickly shifted to any desired position of adjustment, and which will remain set in adjusted positions by reason of being at all times held against jarring and vibration.

Having thus described my invention, I claim:

1. A valve for liquid fuel installations comprising component abutting sections with an eccentrically-disposed transverse flow passage, a shutter plate journaled by concentric bosses in registering pockets in the component sections and capable of being swung crosswise of the passage in controlling flow therethrough, one of said bosses affording journal support for the shutter plate and the other having a surrounding clearance so that said baffle plate may axially "float" without inducing binding, said plate being in full contact with a continuous facing of the one section, and frictionally engaged between said facing and an opposed marginal facing on the other side of the casing extending locally about the flow passage aforesaid so as to remain unaided in shifted positions and yet be movable without undue restraint.

2. A valve for liquid fuel installations including a casing comprising two component abutting sections with eccentrically-disposed aligned openings constituting jointly a transverse flow passage, one of said casing sections being recessed on the abutting side to provide a perimetrical facing and having a circular pocket, and a marginal facing slightly inward—relative to the first—locally about the inflow opening, and the other of said casing members having a continuous facing in abutting relation with the perimetrical facing of the first casing member to effect closure of the recess in the latter as well as a counterpart circular pocket in registry with the first mentioned pocket; and a shutter having concentric bosses journaled in the aforesaid registering pockets with capacity for axially "floating" by virtue of a surrounding clearance about one end of the bosses, said shutter being capable of movement crosswise of the flow passage in controlling flow through the valve while in full contact with the continuous facing aforesaid and frictionally engaged between it and the opposed marginal facing so as to remain unaided in shifted positions and yet be movable without undue restraint.

In testimony whereof, I have hereunto signed my name at Baltimore, Maryland, this 12th day of November 1924.

JAMES D. LALOR.

CERTIFICATE OF CORRECTION.

Patent No. 1,656,280.   Granted January 17, 1928, to

JAMES D. LALOR.

It is hereby certified that the assignee in the above numbered patent was erroneously described and specified as "The Lawlor Fuel Oil System Company, Inc.", whereas said assignee should have been described and specified as "The Lalor Fuel Oil System Company, Inc.", as shown by the records of assignments in this office; and that the said Letters Patent should be read with this correction therein that the same may conform to the record of the case in the Patent Office.

Signed and sealed this 21st day of February, A. D. 1928.

Seal.

M. J. Moore,
Acting Commissioner of Patents.